(12) United States Patent
Akin et al.

(10) Patent No.: US 9,514,197 B2
(45) Date of Patent: Dec. 6, 2016

(54) SYSTEM AND METHOD OF SELECTING EVENTS OR LOCATIONS BASED ON CONTENT

(71) Applicants: Jeremiah Joseph Akin, Pleasant Hill, CA (US); Jayasree Mekala, Austin, TX (US); Praveen Nuthulapati, Austin, TX (US); Joseph Vernon Paulson, IV, Austin, TX (US); Kamal Zamer, Austin, TX (US)

(72) Inventors: Jeremiah Joseph Akin, Pleasant Hill, CA (US); Jayasree Mekala, Austin, TX (US); Praveen Nuthulapati, Austin, TX (US); Joseph Vernon Paulson, IV, Austin, TX (US); Kamal Zamer, Austin, TX (US)

(73) Assignee: eBay Inc., San Jose, CA (US)

(*) Notice: Subject to any disclaimer, the term of this patent is extended or adjusted under 35 U.S.C. 154(b) by 269 days.

(21) Appl. No.: 13/782,749

(22) Filed: Mar. 1, 2013

(65) Prior Publication Data

US 2014/0250128 A1  Sep. 4, 2014

(51) Int. Cl.
*G06F 17/30* (2006.01)
*G06F 21/32* (2013.01)

(52) U.S. Cl.
CPC ........ *G06F 17/30539* (2013.01); *G06F 21/32* (2013.01); *G06T 2207/20144* (2013.01)

(58) Field of Classification Search
CPC .................. G06F 21/32; G06T 2207/20144
USPC .................. 707/776, 737–740, 707; 382/100
See application file for complete search history.

(56) References Cited

U.S. PATENT DOCUMENTS

| | | | |
|---|---|---|---|
| 8,538,402 B2* | 9/2013 | Vidal | H04W 4/00 455/418 |
| 9,293,130 B2* | 3/2016 | Amini | G10L 15/22 |
| 2009/0265631 A1* | 10/2009 | Sigurbjornsson | G06Q 10/10 715/716 |
| 2010/0177193 A1* | 7/2010 | Flores | G08B 13/126 348/148 |
| 2011/0283205 A1 | 11/2011 | Nie et al. | |
| 2012/0047219 A1* | 2/2012 | Feng | G06F 17/3071 709/207 |
| 2013/0097176 A1 | 4/2013 | Khader et al. | |
| 2014/0164454 A1* | 6/2014 | Zhirkov | H03M 7/55 707/829 |

* cited by examiner

*Primary Examiner* — Marc Filipczyk
(74) *Attorney, Agent, or Firm* — Schwegman, Lundberg & Woessner, P.A.

(57) ABSTRACT

Systems and methods of returning location and/or event results using information social media content are provided. One or more social networking servers are accessed to retrieve social media content. One or more items within the social media content are then identified. These items may then be categorized. Information about the categories of the one or more items are stored in a database storing information about locations or events. A search query for a location or event may be received, and results for the search query may be selected by accessing the database and utilizing the information about locations or events as well as the information about the categories of the one or more items. The results may then be returned to a user device for display.

7 Claims, 9 Drawing Sheets

SYSTEM AND METHOD OF SELECTING EVENTS OR LOCATIONS BASED ON CONTENT

BACKGROUND

Event and location review web sites have grown in popularity with the rise of the Internet. Such review sites allow users to both post and read reviews of various locations, such as restaurants, stores, clubs, and the like, as well as events, such as parties, concerts, and so forth. The quality of the reviews, however, depends greatly on the reviewer's subjective opinion. For example, a bar may be an upscale establishment, where patrons generally wear suits, or may be a more casual establishment where people dress more liberally. Reviewers of the bar may focus, however, on items such as service and quality of food, and there may not be any information on how casual the atmosphere is. Such information might be helpful, for example, to a businessman from out of town who just of out of a big meeting and is dressed in a suit and tie and wants a location of a nearby bar at which to have a drink.

Systems and methods of returning location and/or event results using information social media content are provided. One or more social networking servers are accessed to retrieve social media content. One or more items within the social media content are then identified. These items may then be categorized. Information about the categories of the one or more items are stored in a database storing information about locations or events. A search query for a location or event may be received, and results for the search query may be selected by accessing the database and utilizing the information about locations or events as well as the information about the categories of the one or more items. The results may then be returned to a user device for display.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Although the present embodiments have been described with reference to specific example embodiments, it will be evident that various modifications and changes may be made to these embodiments without departing from the broader spirit and scope of the embodiments. Accordingly, the specification and drawings are to be regarded in an illustrative rather than a restrictive sense.

In an example embodiment, content is gathered from social media systems, and this content is correlated with specific locations or events. Aspects of the content are then analyzed and recognized to determine features of the locations or events that may be relevant to users. For example, images or videos posted on a social media website may be analyzed and information extracted in order to correlate aspects of the images with specific locations or events.

Figure 1:
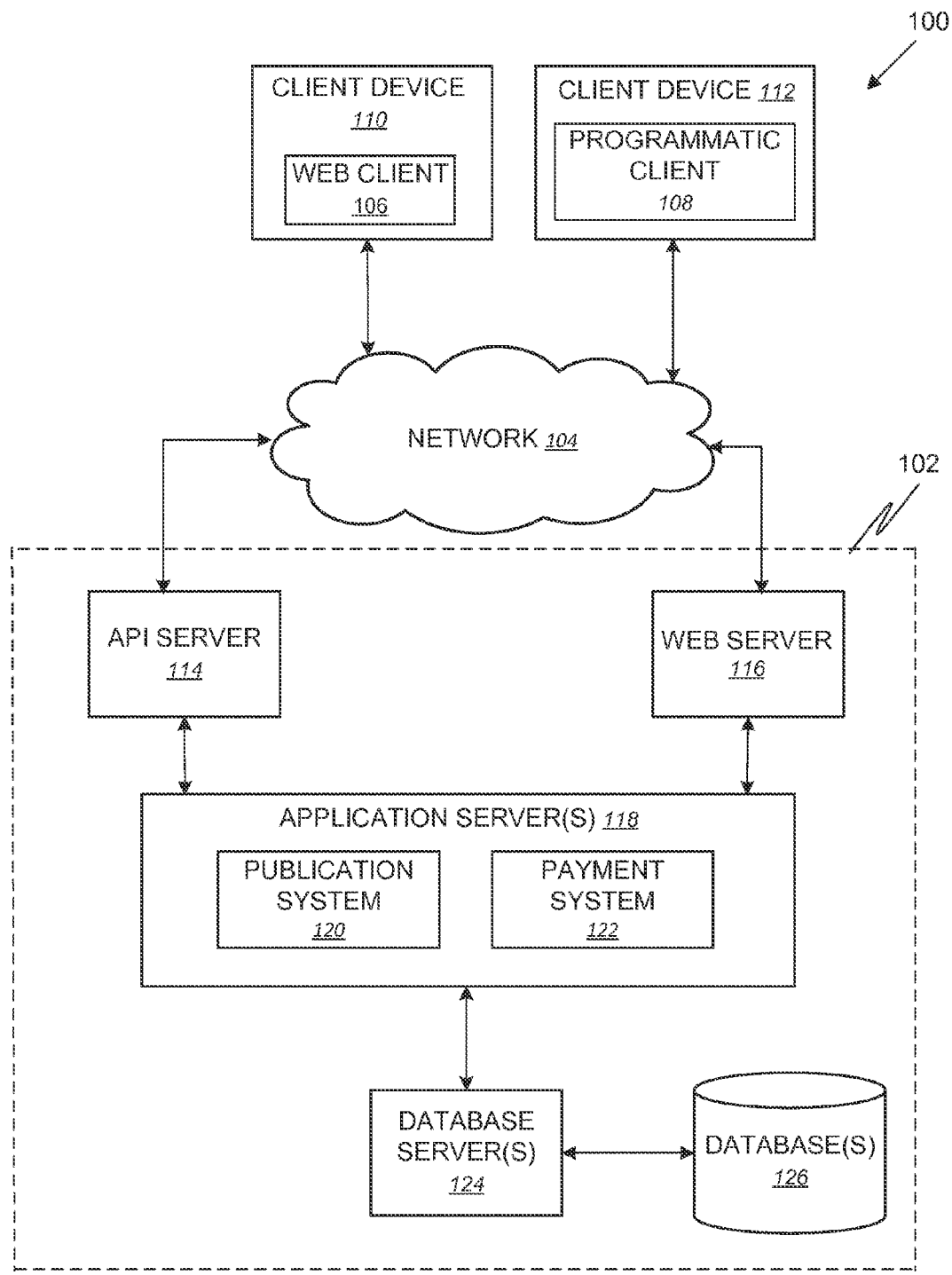
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may include a network-based publisher 102 where clients may communicate and exchange data within the network system 100. The data may pertain to various functions (e.g., online item purchases) and aspects (e.g., managing content) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet, wireless network, cellular network, or a Wide Area Network (WAN)) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user profiles; user attributes; product attributes; product and service reviews; product, service, manufacturer, and vendor recommendations and identifiers; social network commentary; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client device, such as a client device 110 using a web client 106. The web client 106 may be in communication with the network-based publisher 102 via a web server 116. The UIs may also be associated with a client device 112 using a programmatic client 108, such as a client application. It can be appreciated that in various embodiments the client devices 110, 112 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things. The client devices 110 and 112 may comprise a mobile phone, desktop computer, laptop, or any other communication device that a user may use to access the network-based publisher 102.

Turning specifically to the network-based publisher 102, an application program interface (API) server 114 and a web server 116 are coupled to, and provide programmatic and web interfaces respectively to, one or more application servers 118. The application servers 118 host one or more publication systems(s) 120 and one or more payment systems 122. The application servers 118 are, in turn, shown to be coupled to one or more database server(s) 124 that facilitate access to one or more database(s) 126.

In one embodiment, the web server 116 and the API server 114 communicate and receive data pertaining to products, listings, transactions, social network commentary and feedback, among other things, via various user input tools. For example, the web server 116 may send and receive data to and from a toolbar or webpage on a browser application (e.g., web client 106) operating on a client device (e.g., client device 110). The API server 114 may send and receive data to and from an application (e.g., programmatic client 108) running on another client device (e.g., client device 112).

The publication system 120 publishes content on a network (e.g., the Internet). As such, the publication system 120 provides a number of publication and marketplace functions and services to users that access the network-based publisher 102. For example, the publication system(s) 120 may provide a number of services and functions to users for listing goods and/or services for sale, facilitating transactions, and reviewing and providing feedback about transactions and associated users. Additionally, the publication system(s) 120 may track and store data and metadata relating to products, listings, transactions, and user interaction with the network-based publisher 102. The publication system(s) 120 may aggregate the tracked data and metadata to perform data mining to identify trends or patterns in the data. The publication system 120 is discussed in more detail in connection with FIG. 3. While the publication system 120 is discussed in terms of a marketplace environment, it is noted that the publication system 120 may be associated with a non-marketplace environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal account, or credit card) for purchases of items via the network-based marketplace. While the publication system 120 and the payment system 122 are shown in FIG. 1 to both form part of the network-based publisher 102, it will be appreciated that, in alternative embodiments, the payment system 122 may form part of a payment service that is separate and distinct from the network-based publisher 102.

Figure 2:
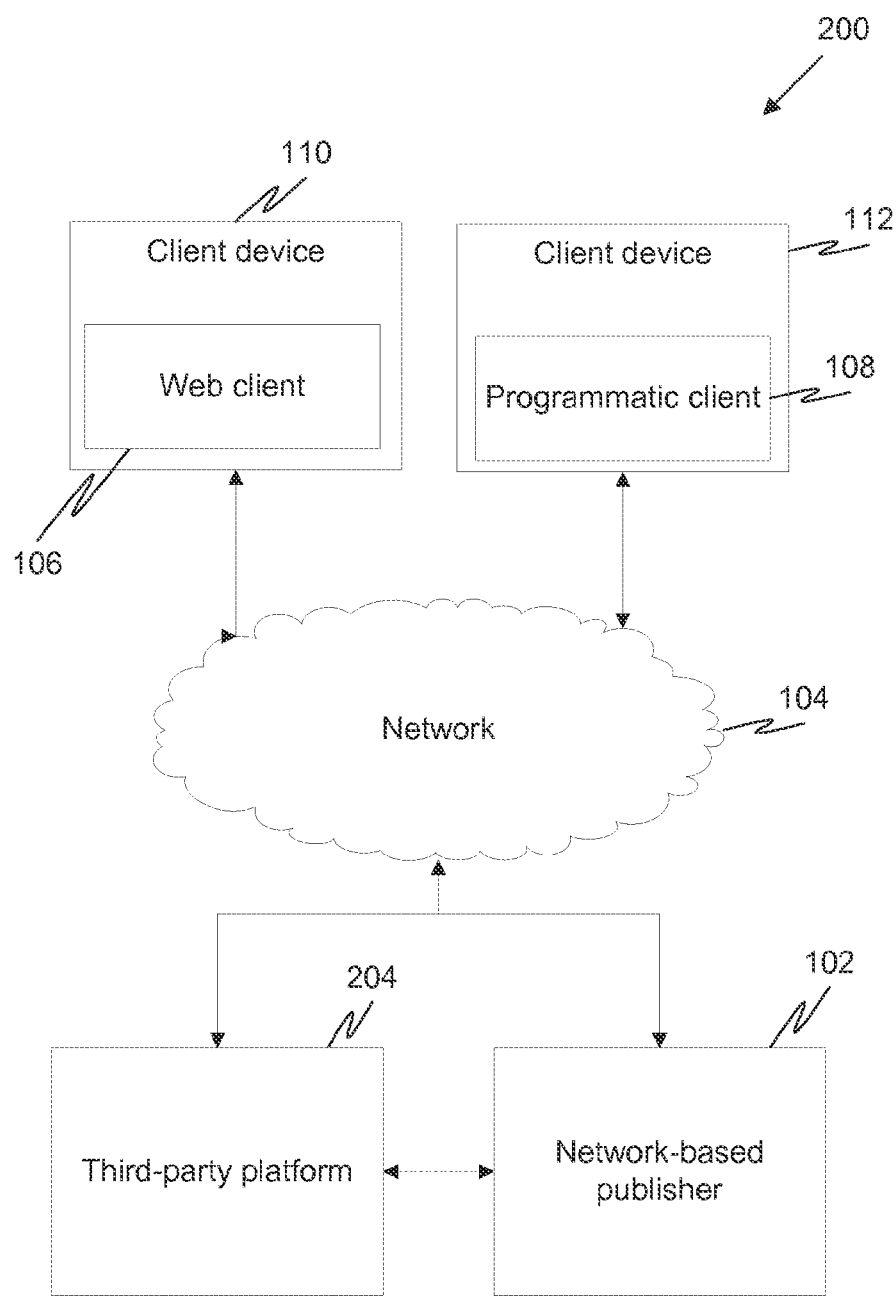
FIG. 2 is a block diagram illustrating a network environment, according to some embodiments.

FIG. 2 is a block diagram illustrating a network environment 200, according to some embodiments. Referring to FIG. 2, a client device 110 executing a web client 106 and a client device 112 executing a programmatic client 108 may communicate with a network-based publisher 102, as described with respect to FIG. 1, or a third-party platform 204 via the network 104. In some embodiments, the third-party platform 204 may be a social networking platform, a gaming platform, or another network-based publisher platform. In some embodiments, the network-based publisher 102 may publish content or applications (e.g., games, social networking applications) on the third-party platform 204 either directly or via the network 104. As client devices 110, 112 interact with third-party platform 204, the network-based publisher 102 may receive data pertaining to the interactions. The data may be received through the use of API calls to open a connection or transmit data between the network-based publisher 102 and the third-party platform 204.

Figure 3:
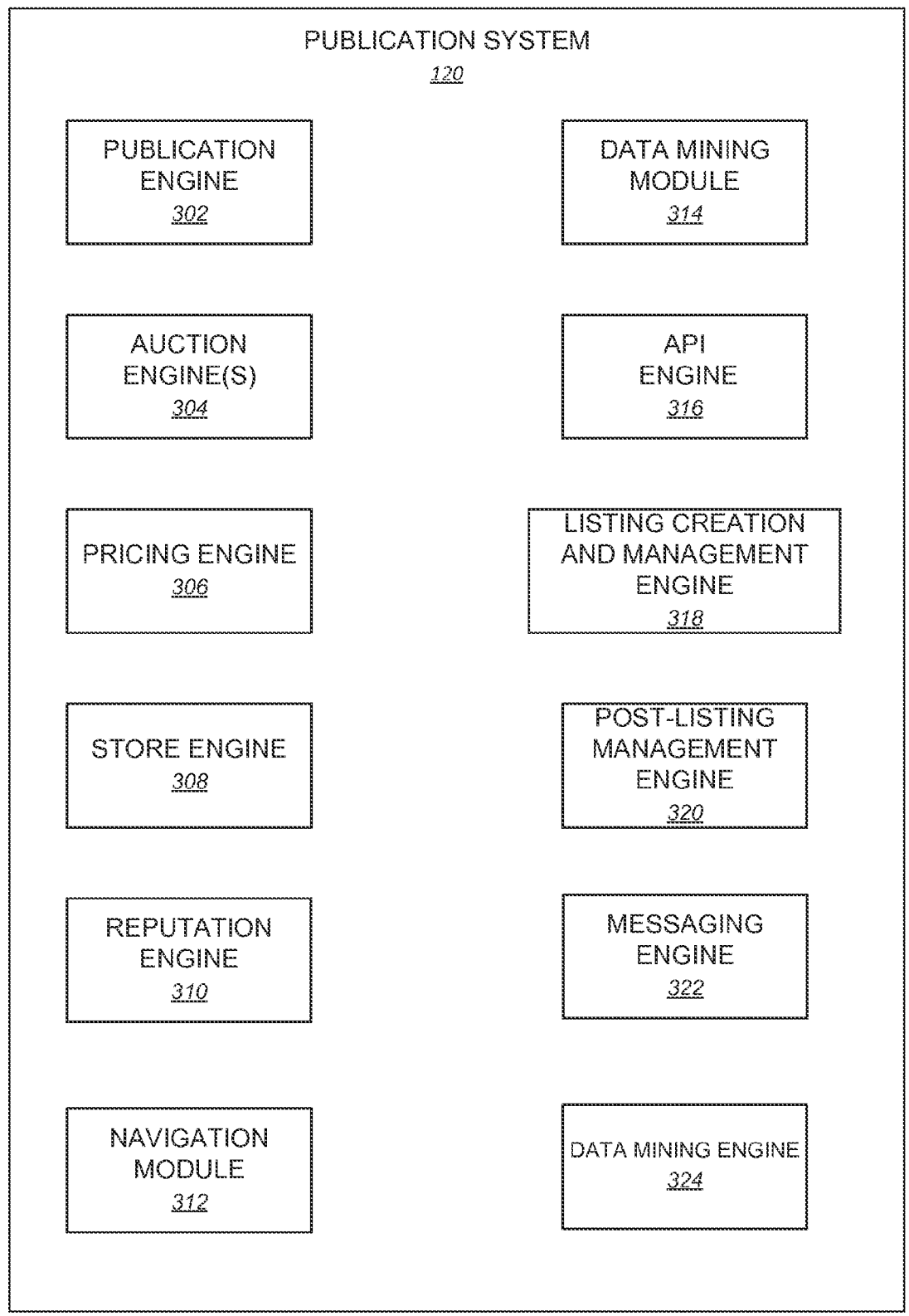
FIG. 3 is an example block diagram illustrating multiple components that, in one example embodiment, are provided within a publication system of a networked system 102.

Referring now to FIG. 3, an example block diagram illustrating multiple components that, in one example embodiment, are provided within the publication system 120 of the network-based publisher 102 (see FIG. 1), is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one embodiment, the publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 302 and one or more auction engines 304 that support auction-format listing and price setting mechanisms (e.g., English, Dutch, Chinese, Double, reverse auctions, etc.). The various auction engines 304 also provide a number of features in support of these auction-format listings, such as a reserve price feature whereby a seller may specify a reserve price in connection with a listing, and a proxy-bidding feature whereby a bidder may invoke automated proxy bidding.

A pricing engine 306 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and may allow a buyer to purchase goods or services, which are also being offered for sale via an auction, for a fixed price that is typically higher than a starting price of an auction for an item.

A store engine 308 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 310 allows users that transact, utilizing the network-based publisher 102, to establish, build, and maintain reputations. These reputations may be made available and published to potential trading partners. Because the publication system 120 supports person-to-person trading between unknown entities, users may otherwise have no history or other reference information whereby the trustworthiness and credibility of potential trading partners may be assessed. The reputation engine 310 allows a user, for example through feedback provided by one or more other transaction partners, to establish a reputation within the network-based publication system over time. Other potential trading partners may then reference the reputation for purposes of assessing credibility and trustworthiness.

Navigation of the network-based publication system may be facilitated by a navigation module 312. For example, a search engine (not shown) of the navigation module 312 enables keyword searches of listings published via the publication system 120. In a further example, a browse engine (not shown) of the navigation module 312 allows users to browse various category, catalog, or inventory data structures according to which listings may be classified within the publication system 120. The search engine and the browse engine may provide retrieved search results or browsed listings to a client device. Various other navigation applications within the navigation engine 312 may be provided to supplement the searching and browsing applications.

In order to make listings available via the network-based publisher 102 as visually informing and attractive as possible, the publication system 120 may include a data mining module 314 that enables users to upload images for inclusion within listings and to incorporate images within viewed listings. The data mining engine 314 also receives social data from a user and utilizes the social data to identify an item depicted or described by the social data.

An API engine 316 stores API information for various third-party platforms and interfaces. For example, the API engine 316 may store API calls used to interface with a third-party platform. In the event a publication application (s) 120 is to contact a third-party application or platform, the API engine 316 may provide the appropriate API call to use to initiate contact. In some embodiments, the API engine 316 may receive parameters to be used for a call to a third-party application or platform and may generate the proper API call to initiate the contact.

A listing management creation and management engine 318 (which could be a separate creation engine and a separate management engine) allows sellers to create and manage listings. Specifically, where a particular seller has authored or published a large number of listings, the management of such listings may present a challenge. The listing creation and management engine 318 provides a number of features (e.g., auto-relisting, inventory level monitors, etc.) to assist the seller in managing such listings.

A post-listing management engine 320 also assists sellers with a number of activities that typically occur post-listing. For example, upon completion of an auction facilitated by the one or more auction engines 304, a seller may wish to leave feedback regarding a particular buyer. To this end, the post-listing management engine 320 provides an interface to the reputation engine 310 allowing the seller to conveniently provide feedback regarding multiple buyers to the reputation engine 310.

A messaging engine 322 is responsible for the generation and delivery of messages to users of the network-based publisher 102. Such messages include, tier example, advising users regarding the status of listings and best offers (e.g., providing an acceptance notice to a buyer who made a best offer to a seller). The messaging engine 322 may utilize any one of a number of message delivery networks and platforms to deliver messages to users. For example, the messaging engine 322 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

A data mining engine 324 analyzes the data gathered by the network-based publisher 102 from interactions between the client devices 110, 112 and the network-based publisher 102. In some embodiments, the data mining engine 324 also analyzes the data gathered by the publication system 102 from interactions between components of the network-based publisher 102 and/or client devices 110, 112 and third-party platforms, such as social networks like Twitter™, and also publications, such as eBay and Amazon. The data mining engine 324 uses the data to identify certain trends or patterns in the data. For example, the data mining engine 324 may identify patterns, which may help to improve search query processing, user profiling, and identification of relevant search results, among other things.

A taxonomy engine (not pictured) uses the patterns and trends identified by the data mining engine 324 to obtain a variety of data, including products, item listings, search queries, keywords, search results, and individual attributes of items, users, or products, among other things, and revise the publication system taxonomy as discussed below. In some embodiments, the taxonomy engine 326 may assign a score to each piece of data based on the frequency of occurrence of the piece of data in the mined set of data. In some embodiments, the taxonomy engine 326 may assign or adjust a score of a piece of data pertaining to an item (e.g., one or more keywords with logic, a product listing, an individual attribute of the item) based on input data received from users. The score may represent a relevance of the piece of data to the item or an aspect of the item. In some embodiments, the taxonomy engine 326 may compare data received from the third party platform to previously received and stored data from the third party platform. Alternatively, the taxonomy engine may compare data received from the third party platform with data in the publication system's own taxonomy.

Although the various components of the publication system 120 have been defined in terms of a variety of individual modules, a skilled artisan will recognize that many of the items can be combined or organized in other ways. Furthermore, not all components of the publication system 120 have been included in FIG. 3. In general, components, protocols, structures, and techniques not directly related to functions of example embodiments (e.g., dispute resolution engine, loyalty promotion engine, personalization engines, etc.) have not been shown or discussed in detail. The description given herein simply provides a variety of example embodiments to aid the reader in an understanding of the systems and methods used herein.

Figure 4:
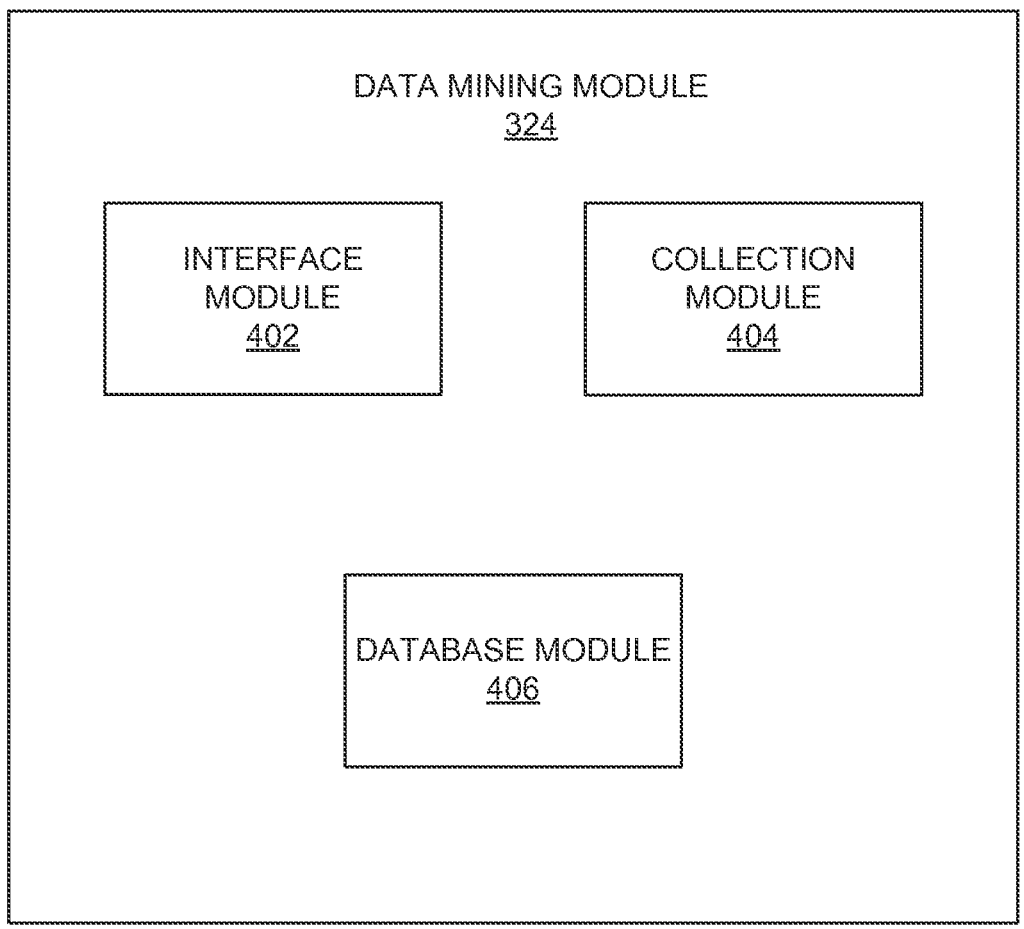
FIG. 4 is a block diagram illustrating a data mining module, according to some embodiments.

FIG. 4 is a block diagram illustrating the data mining engine 324, according to some embodiments. Information may be mined from social media websites and communications, such as from Facebook™ and Twitter™ feeds.

Referring to FIG. 4, an interface module 402 may store components used to interface with a third party platform such as 204 of FIG. 2 from which data is mined. The third party platform could be from eBay and/or Amazon, or from a social network such as Twitter™. Interfacing with third party platforms may entail providing data related to items about which searches or opinions from users of the third party platform are solicited. The user input may include search keywords, descriptions, opinions, or other text, along with non-textual input, such as clicks, highlighting, and other interactions with the provided item text and visual data.

A collection module 404 collects the data mined from the third party platform. For mining Twitter™, tweets and retweets of a particular search may be included. In some embodiments the publication system may also store Twitter™ IDs, their bio, location, how many followers, their following, and similar information that may be publically available from the social network. In some embodiments, the collection module 404 interfaces with the third party platform 204 directly and collects data entered by the user. In some embodiments, the collection module 404 collects the data from the interface module 402.

A database module 406 interfaces with one or more databases such as database 126 of FIG. 1 to store the data collected by the collection module 404. The database module 406 also interfaces with the one or more databases to retrieve data related to the items presented in the third party platform. For example, the database module 406 may retrieve searches related to a certain product, and provide the searches to the third party platform for purposes of comparing a user's search to previously stored searches. Based on the comparison, the interface module 402 or the taxonomy engine 326 may revise the publication system's taxonomy.

Figure 5:
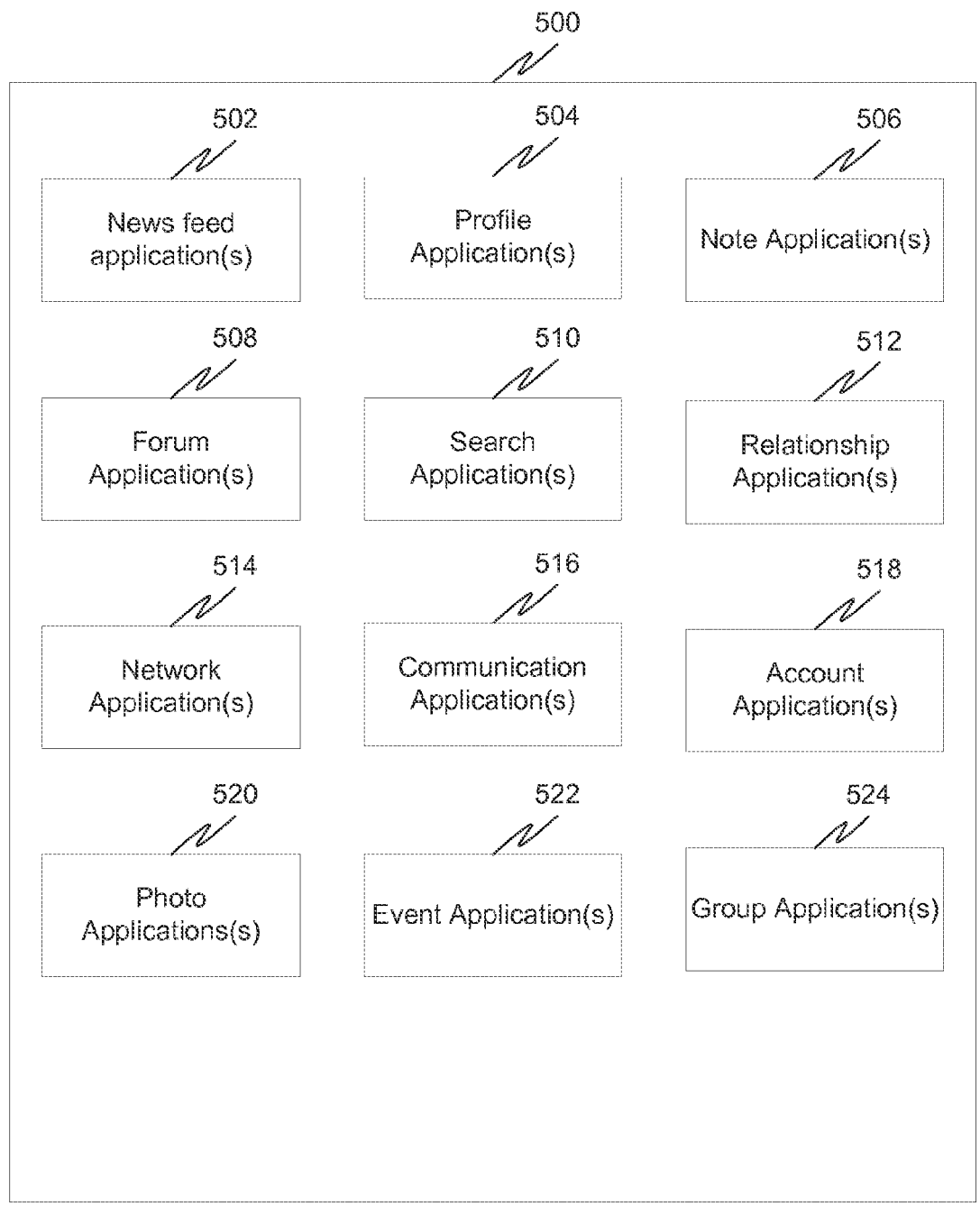
FIG. 5 is a block diagram illustrating social applications that execute on a social networking server, such as one located on a third-party platform, according to an example embodiment.

FIG. 5 is a block diagram illustrating social applications 500 that execute on a social networking server, such as one located on a third-party platform 204 of FIG. 2, according to an example embodiment. The social platform applications 500 include news feed applications 502, profile applications 504, note applications 506, forum applications 508, search applications 510, relationship applications 512, network applications 514, communication applications 516, account applications 518, photo applications 520, event applications 522, and group applications 524.

The news feed applications 502 publish events associated with the user and friends of the user on the social networking server. The news feed applications 502 may publish the events on the user profile of a user. For example, the news feed applications 502 may publish the uploading of a photo album by one user on the user profile of the user and the user profiles of friends of the user.

The profile applications 504 may maintain user profiles for each of the users on the social networking server. Further, the profile applications 504 may enable a user to restrict access to selected parts of their profile to prevent viewing by other users. The note applications 506 may be used to author notes that may be published on various user interfaces.

The forum applications 508 may maintain a forum in which users may post comments and display the forum via the profile associated with a user. The user may add comments to the forum, remove comments from the forum, and restrict visibility to other users. In addition, other users may post comments to the forum.

The search applications 510 may enable a user to perform a keyword search for users, groups, and events. In addition, the search applications 510 may enable a user to search for content (e.g., favorite movies) on profiles accessible to the user.

The relationship applications 512 may maintain relationship information for the users. The network applications 514 may facilitate the addition of social networks by a user, with the social networks based on a school, workplace, or region, or any social construct for which the user may prove an affiliation. The communication applications 516 may process incoming and outgoing messages, maintain an inbox for each user, facilitate sharing of content, facilitate interaction among friends (e.g., poking), process requests, process events, process group invitations, and process communicating notifications.

The account applications 518 may provide services to facilitate registering, updating, and deleting user accounts. The photo applications 520 may provide services to upload photographs, arrange photographs, set privacy options for albums, and tag photographs with text strings. The event applications 522 may provide services to create events, review upcoming events, and review past events. The group applications 524 may be used to maintain group information, display group information, and navigate to groups.

Figure 6:
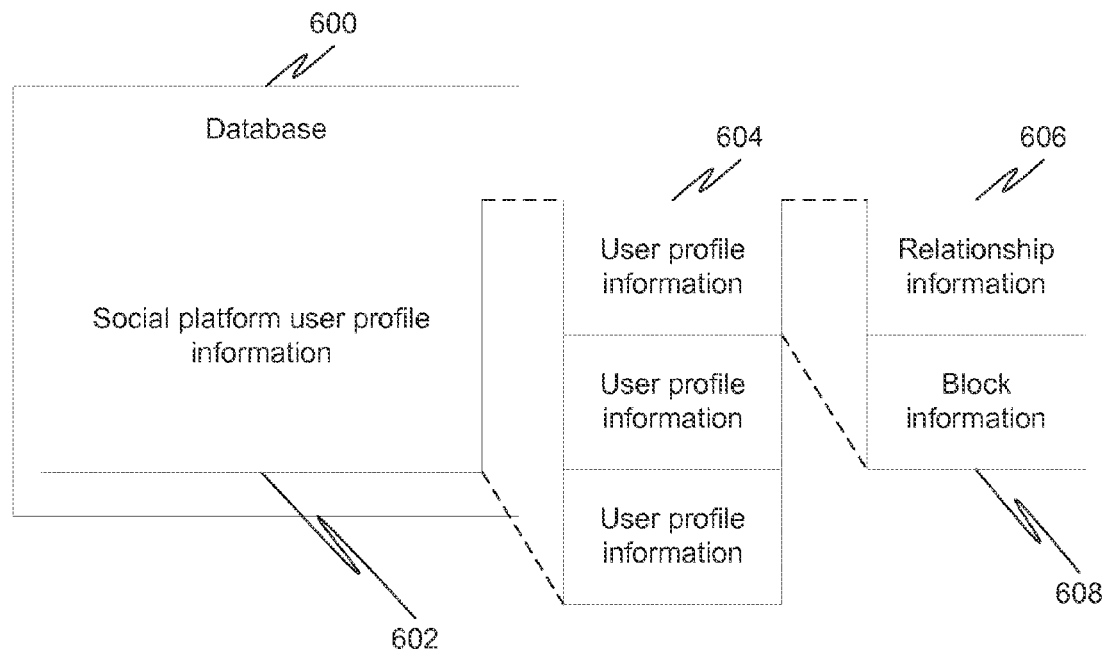
FIG. 6 is a block diagram illustrating a database, according to an embodiment, at the social networking server.

FIG. 6 is a block diagram illustrating a database 600, according to an embodiment, at the social networking server. The database 600 is shown to include social platform user profile information 602 that stores user profile information 604 for each user on the social networking server. The user profile information 604 may include information related to the user and, specifically, may include relationship information 606 and block information 608. The relationship information 606 may store a predetermined relationship between the user associated with the user profile information 604 and other users on the social networking server. For example, a first user may be designated a "friend," "favorite friend," or the like, with a second user, with the first user associated with the user profile information 604 and the respective designations associated with increasing levels of disclosure between the first user and second user. The block information 608 may store a configured preference of the user to block the addition of an item by other users to a watch list associated with the user. In some instances, one or more components of the network-based publisher 102 of FIG. 1 may be able to access specified portions of the database 600 via, for example, a programmatic interface. As such, data from the database may be mined.

In an example embodiment, social media content (e.g., items posted on a social media website, such as Facebook™ or distributed through social media communication, such as Twitter™ feeds) may be mined for information that may be relevant to locations or events. While it is common for users to "tag" photos, videos, and posts in social media with location information (such as with "check-ins"), in an example embodiment, the content that is posted, such as video, audio, images, and the like, may be analyzed and information extracted from the content itself.

Various filters and/or recognition systems may be utilized to aid in the extraction of information from this social media content. In example embodiments, image recognition systems may be used to match items within an image to certain pre-established criteria. Text, for example, can be extracted from images. In another example embodiment, items within the image can be matched to a database of items to identify the items themselves. For example, t-shirts with certain logos can be matched to t-shirts in a database. This would allow, for example, a user to then specify a search for locations that either do or do not have patrons wearing such clothing.

In another example, some cities contain multiple sports teams that are rivals of each other. There may be certain locations within such cities that are more prevalently visited by fans of a first of the teams as opposed to fans of a second of the teams. In such a case, a fan of the second of the teams may wish to avoid places that are frequented by fans of the first of the teams Image recognition may be applied to more than just clothing items, of course. In another example embodiment, the gender of the people in videos or images at a location is tracked. This would allow, for example, a user to select locations that have a higher percentage of female patrons.

Image recognition can be applied to still images or to video, which is actually a combination of multiple still images. In another example embodiment, audio may be analyzed from social media content. This audio may be from videos or from stand-alone audio clips. The audio may be converted to a waveform, and the waveform may be compared against known waveforms in a database. This may be performed using, for example, speech recognition processes, although analyzing speech is only one example of how audio can be analyzed. In another example embodiment, sounds, even background sounds, can be analyzed and classified, and therefore attributed to a location. As an example, hotels can often be located in undesirable locations, such as in the flight path of a local airport, without any indication that this is the case on review web sites. An example embodiment could analyse video taken at the hotel from social media and determine that background airplane noise is present in a large percentage of such videos. The hotel may then be labelled as "airport-adjacent," even though the hotel may not actually be that close to the airport. Similar tracking can take place with other noises (e.g., traffic, fire engine noises, loud neighbors, etc.)

Figure 7:
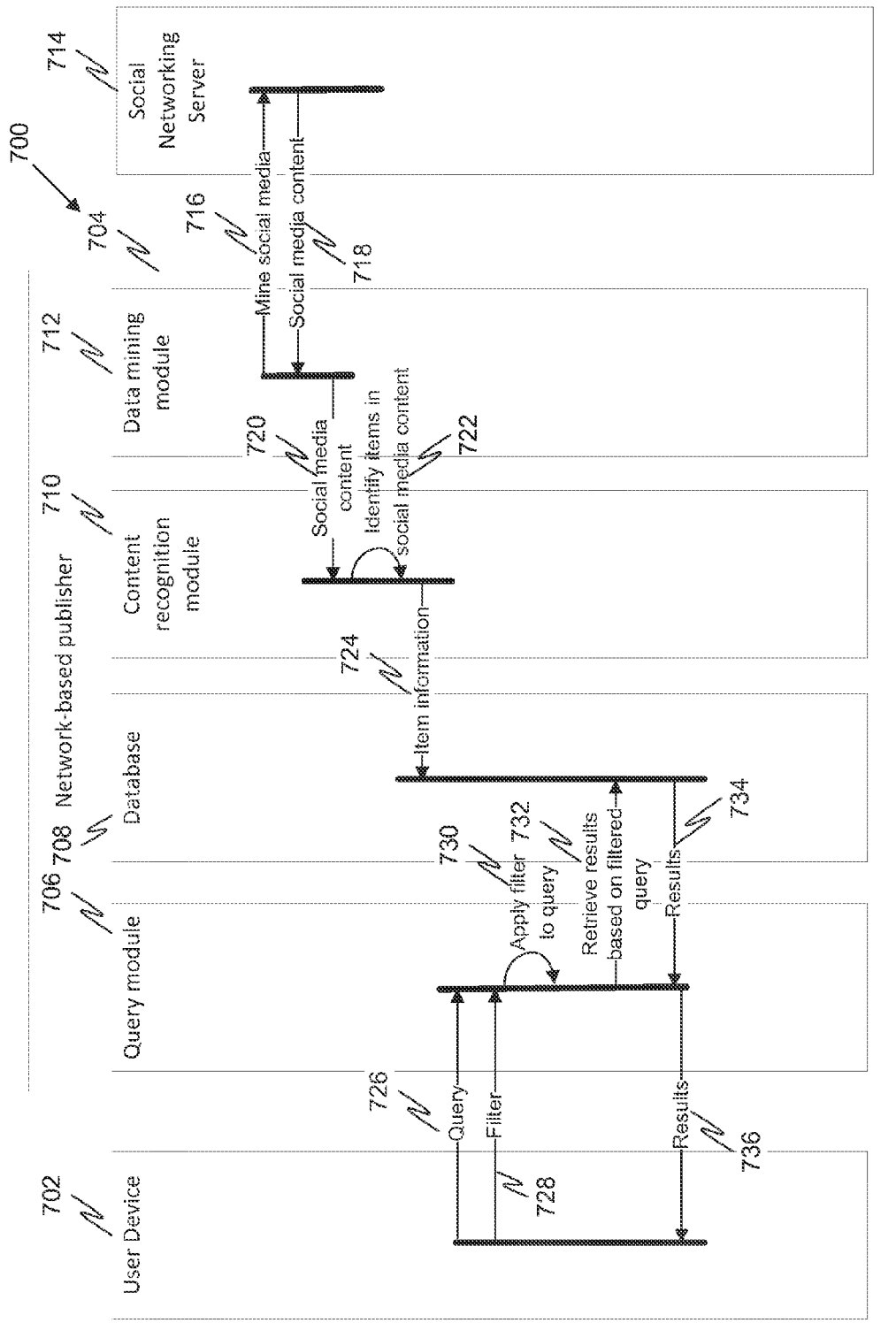
FIG. 7 is an interaction diagram illustrating a method, in accordance with an example embodiment, of selecting events or locations based on social media content.

FIG. 7 is an interaction diagram illustrating a method 700, in accordance with an example embodiment, of selecting events or locations based on social media content. In this method 700, a user device 702 interacts with a network-based publisher 704. The network based publisher 704 includes a query module 706, database 708, content recognition module 710, and data mining module 712. The network-based publisher 704 interacts with a social networking server 714. At operation 716, the data mining module 712 mines social media from the social networking server 714. This may include accessing one or more interfaces to access the social networking server 714. In some example embodiments, a mapping is maintained by the data mining module 712 in order to determine which portions of a social networking server and which data to access during this mining. For example, accessing content on Facebook™ may be much different than accessing data on Twitter™. The mapping may store one set of instructions for accessing Facebook™ and a different set of instructions for accessing Twitter™.

At operation 718, mined social media content is retrieved by the data mining module 712. At 720, this mined social media content is forwarded to a content recognition module 710. At operation 722, the content recognition module identifies items in the social media content. This may include using, for example, audio and/or image recognition processes to aid in the identification. At operation 724, information about identified items in the social media content is stored in the database 708. This item information may include, for example, a categorization of the item, perhaps in multiple categories. The database 708 may already include information about locations and events, and the item information may be tied to such locations and events in the database 708.

At operation 726, a query is received at the query module 706 from the user device 702. This query may be used to identify a location or event of interest. At operation 728, a filter is received at the query module 706 from the user device 702. This filter may further limit the location or event of interest. In an example embodiment, the filter is directed to a category identified in the social media content item information. For example, a query may be "show me hotels near this area" and the filter may be "without airplane noise." At operation 730, the filter is applied to the query. In some example embodiments, the query and the filter are one, and arrive as a single detailed query (e.g., "show me hotels near this area without airplane noise), and operations 728 and 730 are unnecessary.

At operation 732, the query module 706 retrieves results from the database 708 based on the filtered query. These results are passed at operation 734 and forwarded from the query module 706 to the user device 702 at operation 736.

Figure 8:
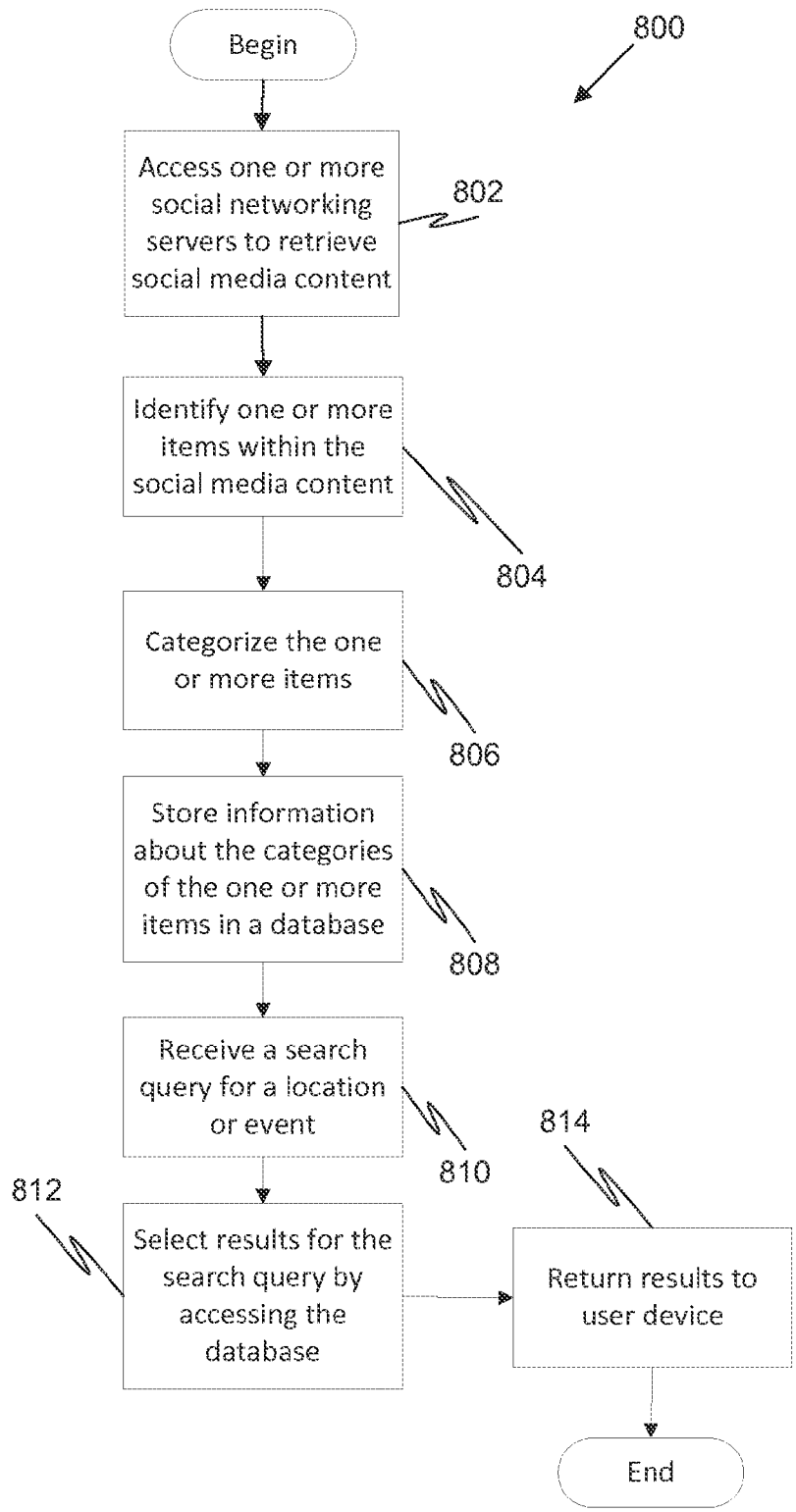
FIG. 8 is a flow diagram illustrating a method, in accordance with another example embodiment.

FIG. 8 is a flow diagram illustrating a method 800, in accordance with another example embodiment. At operation 802, one or more social networking servers are accessed to retrieve social media content. This content may be, for example, still pictures, audio files, and/or videos. At operation 804, one or more items within the social media content may be identified. At operation 806, the one or more items may be categorized. Operations 804 and 806 may include, for example, performing image and/or audio recognition. At operation 808, information about the items, as derived by the identification and categorization, may be stored in a database.

At operation 810, a search query for a location or event is received from a user device. At operation 812, results for the search query may be selected by accessing the database and utilizing the information about the items (as well as information about locations and/or events) to determine which results to return. At operation 814, the results are returned to the user device.

Figure 9:
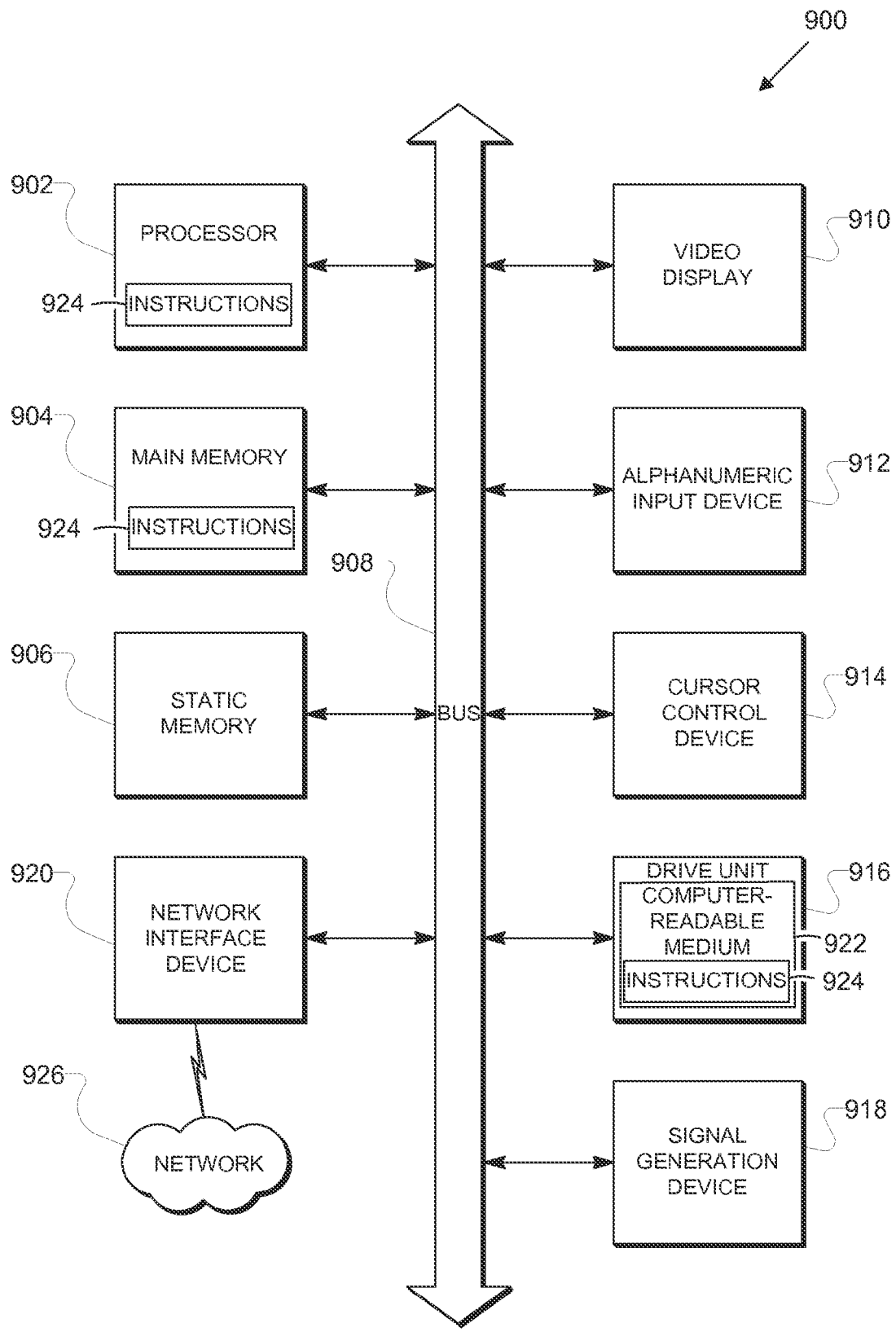
FIG. 9 shows a diagrammatic representation of a machine in the example form of a computer system within which a set of instructions for causing the machine to perform any one or more of the methodologies discussed herein may be executed.

FIG. 9 shows a diagrammatic representation of a machine in the example form of a computer system 900 within which a set of instructions 924 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker), and a network interface device 920.

The disk drive unit 916 includes a computer-readable medium 922 on which is stored one or more sets of instructions 924 (e.g., software) embodying any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media. The instructions 924 may further be transmitted or received over a network 926 via the network interface device 920.

While the computer-readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding, or carrying a set of instructions for execution by the machine and that cause the machine to perform any one or more of the methodologies described herein. The term "machine-readable medium" shall accordingly be taken to include, but not be limited to, solid-state memories, optical and magnetic media, and carrier wave signals.

Although the inventive concepts have been described with reference to specific example embodiments, it will be evident that various modifications and changes may be made to these embodiments without departing from the broader spirit and scope of the inventive concepts. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A system, comprising:
 a data mining module, executable by a hardware processor, configured to mine images in non-text social media content from a social networking server, the social networking server being a server which allows users to post updates of activities and include audio recorded at the activities;
 a database storing location information;
 a content recognition module configured to identify one or more items within images in the non-text social media content, by performing image recognition on the images to match visual representations of the one or more images within the non-text social media content to visual representations stored in a database of items, the database of items containing identification information about the one or more items, to identify location in which the social media content was generated, and to store the identification information about the identified one or more items from the database of items, in another database, in a manner that ties the identification information to a database entry for the location, the content recognition module extracting background sounds from the audio, converting the background sounds to a waveform, comparing the waveform to a database of known waveforms to analyze and classify the background sounds, and storing the classification of the background sounds in the another database in a manner that ties the classification of the background sounds to the database entry for the location; and
 a query module configured to receive a query regarding the one or more items from a user device and to return results to the user device, the results including additional information, other than the identification information about the identified one or more items, tied to the database entry pertaining to the location.

2. The system of claim 1, wherein the system is implemented on a network-based publisher.

3. The system of claim 1, wherein the social networking server further permits users to identify a location where an image was taken.

4. A method, comprising:
 accessing one or more social networking servers to retrieve images from non-text social media content, the non-text social media content further includes an audio file;
 identifying one or more items within the images in the non-text social media content by performing image recognition on the images to match visual representations of the one or more images within the non-text social media content to visual representations stored in a database of items, the database of items containing identification information about the one or more items;
 categorizing the one or more items using the identification information;
 identifying a location or event at which the non-text social media content was generated;
 storing information about the categories of the one or more items in a database storing information about locations or events from the database of items, in another database, in a manner that ties the information to a database entry for the location;
 receiving a search query for a location or event;
 adding a first category as a filter for the search query;
 performing the search query by selecting results for the search query by accessing the database storing information about locations or events and utilizing the information about locations or events as well as the information about the categories of the one or more items; and
 returning the results to a user device for display; and
 the identifying and categorizing further includes extracting background sounds from the audio file, converting the background sounds to a waveform, compares the waveform to a database of known waveforms to analyze and classify the background sounds, and storing the classification of the background sounds in the another database in a manner that ties the classification of the background sounds to the database entry for the location.

5. A non-transitory computer-readable storage medium comprising instructions that, when executed by at least one processor of a machine, cause the machine to perform operations comprising:
 accessing one or more social networking servers to retrieve images from non-text social media content, the non-text social media content further including an audio file;

identifying one or more items within the images in the non-text social media content by performing image recognition on the images to match visual representations of the one or more images within the non-text social media content to visual representations stored in a database of items, the database of items containing identification information about the one or more items;

categorizing the one or more items using the identification information;

identifying a location or event at which the non-text social media content was generated;

storing information about the categories of the one or more items in a database storing information about locations or events from the database of items, in another database, in a manner that ties the information to a database entry for the location;

receiving a search query for a location or event;

adding a first category as a filter for the search query;

performing the search query by selecting results for the search query by accessing the database storing information about locations or events and utilizing the information about locations or events as well as the information about the categories of the one or more items;

returning the results to a user device for display; and the identifying and categorizing further including extracting background sounds from the audio file, converting the background sounds to a waveform, compares the waveform to a database of known waveforms to analyze and classify the background sounds, and storing the classification of the background sounds in the another database in a manner that ties the classification of the background sounds to the database entry for the location.

6. A method, comprising:

accessing one or more social networking servers to retrieve images from non-text social media content, the non-text social media content is a video;

identifying one or more items within the images in the non-text social media content by performing image recognition on the images to match visual representations of the one or more images within the non-text social media content to visual representations stored in a database of items, the database of items containing identification information about the one or more items;

categorizing the one or more items using the identification information;

identifying a location or event at which the non-text social media content was generated;

storing information about the categories of the one or more items in a database storing information about locations or events from the database of items, in another database, in a manner that ties the information to a database entry for the location;

receiving a search query for a location or event;

adding a first category as a filter for the search query;

performing the search query by selecting results for the search query by accessing the database storing information about locations or events and utilizing the information about locations or events as well as the information about the categories of the one or more items;

returning the results to a user device for display; and the identifying and categorizing further includes extracting background sounds from the video file, converting the background sounds to a waveform, comparing the waveform to a database of known waveforms to analyze and classify the background sounds, and storing the classification of the background sounds in the another database in a manner that ties the classification of the background sounds to the database entry for the location.

7. A non-transitory computer-readable storage medium comprising instructions that, when executed by at least one processor of a machine, cause the machine to perform operations comprising:

accessing one or more social networking servers to retrieve images from non-text social media content, the non-text social media content is a video;

identifying one or more items within the images in the non-text social media content by performing image recognition on the images to match visual representations of the one or more images within the non-text social media content to visual representations stored in a database of items, the database of items containing identification information about the one or more items;

categorizing the one or more items using the identification information;

identifying a location or event at which the non-text social media content was generated;

storing information about the categories of the one or more items in a database storing information about locations or events from the database of items, in another database, in a manner that ties the information to a database entry for the location;

receiving a search query for a location or event;

adding a first category as a filter for the search query;

performing the search query by selecting results for the search query by accessing the database storing information about locations or events and utilizing the information about locations or events as well as the information about the categories of the one or more items;

returning the results to a user device for display; and the identifying and categorizing further includes extracting background sounds from the video file, converting the background sounds to a waveform, compares the waveform to a database of known waveforms to analyze and classify the background sounds, and storing the classification of the background sounds in the another database in a manner that ties the classification of the background sounds to the database entry for the location.

* * * * *